United States Patent [19]

Nilsson

[11] 4,296,772
[45] Oct. 27, 1981

[54] NON-RETURN VALVE

[75] Inventor: Robert Nilsson, Bromölla, Sweden

[73] Assignee: Evak Sanitar AB, Bromölla, Sweden

[21] Appl. No.: 114,773

[22] Filed: Jan. 23, 1980

[30] Foreign Application Priority Data

Feb. 2, 1979 [SE] Sweden ............................. 7900925

[51] Int. Cl.$^3$ ............................................. F16K 17/12
[52] U.S. Cl. .................................. 137/269.5; 137/271; 137/527.8
[58] Field of Search ............... 137/269.5, 527, 527.8, 137/271

[56] References Cited

U.S. PATENT DOCUMENTS

| | | | |
|---|---|---|---|
| 793,577 | 6/1905 | Frank | 137/269.5 X |
| 834,784 | 10/1906 | Wilber | 137/269.5 |
| 2,771,901 | 11/1956 | Speck | 137/269.5 |
| 3,687,155 | 8/1972 | Wheatley | 137/527.8 X |

Primary Examiner—Alan Cohan
Attorney, Agent, or Firm—Ladas & Parry

[57] ABSTRACT

A non-return valve has a housing being symmetric with respect to a plane perpendicular to the direction of flow, and having facing inlet and outlet openings with surrounding identical valve seats, and identical bearing means adjacent each opening for holding a reversible valve flap. One flat side of the valve housing forms an inspection cover and, together with the opposite parallel flat side, carries the bearing means. Between the flat sides there extend parallel transverse sides and end sides which make an obtuse angle α with one transverse side and an acute angle with the other transverse side. One end side defines the inlet opening and the other end side the outlet opening.

5 Claims, 2 Drawing Figures

4,296,772

NON-RETURN VALVE

FIELD OF THE INVENTION

The present invention relates to a non-return valve, particularly for vacuum-operated drain pipes, comprising a valve housing with an inlet and an outlet opening, a valve flap and an inspection cover.

BACKGROUND OF THE INVENTION

In the rapidly expanding field of vacuum transport techniques, in particular in connection with water-miser vacuum closets and drain pipes, non-return valves are of great importance and, in some cases, have come to serve new purposes.

Prior art non-return valves for pressure systems in most cases are far too heavy and unwieldy and, needless to say, too robust in systems where the pressure difference rarely exceeds 0.05 MPa. Novel constructions exist where regard has been paid to the above deficiencies in that the valves have been made of plastic and provided with connecting sockets instead of flanges but where, nonetheless, the particular drawbacks have remained.

A special problem in vacuum-operated closet devices used in mobile units, such as boats and railway carriages, is that the non-return valve must be located at the highest point of the system. In actual practice, this means in most cases that the valve must be disposed immediately under a ceiling. In extant constructions, the service or inspection cover on the non-return valve will then be located at a distance of only a few centimeters from the ceiling and, hence, it will be difficult to remove the screws securing the inspection cover. When, despite such difficulties, the cover has been removed and it has been established that the valve is leaking because the flap is worn out and there is no spare flap at hand, a long stoppage of the system may be necessary.

Also, the valves hitherto used must be mounted for through-flow in the right direction, since, if the valves are incorrectly mounted, which occurs more often than may be imagined even with experienced fitters, the system will not work and so the valve must be dismounted and reversed, which not only entails increased costs but also is a source of irritation.

SUMMARY OF THE INVENTION

There is provided, in accordance with the present invention, a non-return valve which has a valve housing with two parallel flat sides, a lower and an upper transverse side. The latter sides extend between the flat sides of the housing which further comprises two end sides also extending between the flat sides and making an obtuse angle with the lower transverse side and an acute angle with the upper transverse side. The two end sides each defines an opening. One of the flat sides is removably connected to the adjoining transverse and end sides and serves as an inspection cover. The valve further comprises valve seats each surrounding one of the aforesaid openings, a valve flap, and identical bearing means which are arranged in conjunction with the openings for carrying the valve flap for opening and closing one or the other of said openings. Thus, according to the invention, there is provided a simple and reliable valve with an easily exchangeable flap which can be shifted between the openings. Owing to its design, the valve may readily be mounted adjacent a ceiling and since one flat side forms an inspection cover, the interior of the valve is easily accessible.

In this specification and in the claims, the term "bearing bushing" means any element or boring capable of receiving a turnable shaft or a shaft on which a turnable member is journaled.

DESCRIPTION OF THE DRAWING

The invention will be described in greater detail hereinbelow with reference to the accompanying drawing showing an embodiment of the invention and in which:

As shown in FIGS. 1 and 2, the non-return valve according to the invention comprises a housing 1 which has two planar parallel flat sides 2, 3, two parallel transverse sides 6, 7 extending between the flat sides, and two end sides 4, 5 extending between the flat sides and the transverse sides. As appears from FIG. 1, the end sides 4, 5 are not in parallel with each other but inclined so as to make an obtuse angle $\alpha$ with the lower transverse side 6 and, consequently, an acute angle with the opposite, upper transverse side 7. The angle $\alpha$ is suitably selected within the range of 95°–130°. The end sides 4, 5 each has an opening 23 and 25, respectively, and on the outer side of the valve housing 1 there are provided pipe sockets 24 and 26 which surround the openings 23 and 25, respectively. As is evident from FIG. 1, the openings 23, 25 are located opposite each other. Since the valve housing 1 is to be fixed on a wall, post or the like, it has mounting flanges 18, 19. In order to permit access to the interior of the valve housing, the entire flat side 3 forms an inspection cover which is connected to the valve housing 1 with the aid of flanges 20, 21 and bolts 22 extending through the cover and the flanges. A seal 29 is mounted in a per se known fashion between the inspection cover and the valve housing.

Those portions of the inner surfaces of the end sides 4, 5 which surround the openings 23 and 25, respectively, serve as valve seats 8, 9. A valve body 10 in the form of a valve flap is adapted to engage either of these valve seats. The valve flap 10, like the valve housing 1, is preferably made of plastic and is in the form of a disk having a bearing lug 27. The disk has identical opposed sealing surfaces and, as is shown in FIG. 1, is symmetric with respect to its longitudinal central plane. The end of the lug 27 which is remote from the discoid portion of the flap widens in the manner shown in FIG. 1, for receiving a bearing shaft 11. The shaft 11 projects on opposite sides of the lug 27 and the projecting ends of the shaft are mounted each in a bearing bushing 13, 15 provided in conjunction with the two openings 23 and 25. The bearing bushings 13 are fixed to the flat side 2 in the corner between the transverse side 7 and the respective end sides 4 and 5, it being obvious that the shape of the bearing bushings closely joins the curvature of the corner. The other bearing bushings 15 are fixed to the inner side of the inspection cover and slightly taper inwardly. Each of the bearing bushings 13 and 15 has an opening 14 and 17, respectively, for receiving said projecting ends of the bearing shaft 11 of the valve flap. As shown in FIG. 2, the upper widened portion of the lug 27 is of such length that it substantially fills the space between the bearing bushings 13 and 15, so that the valve flap will be firmly guided when pivoting about its shaft 11. As shown at 16 in FIG. 2, the bearing bushing 15 on the inner side of the inspection cover may be fixed by gluing or welding.

Figure 2:
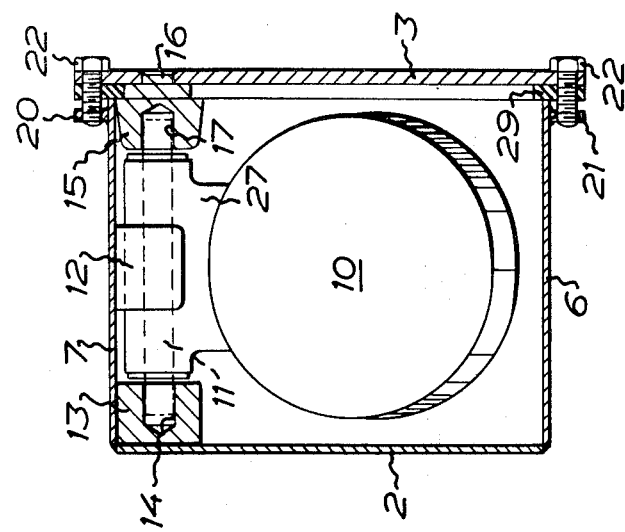
FIG. 2 is a section along the line II—II in FIG. 1.

As is evident from the above, the non-return valve according to the invention is symmetric with respect to its central plane 28 perpendicular to the direction of flow. This plane also contains an abutment 12 mounted on the upper transverse side 7 and protruding into the cavity of the valve housing. The object of the abutment 12 is to restrict the pivotal movement of the valve flap 10 in the case of a vertically mounted valve assembly, such that the flap 10 is prevented from pivoting past the vertical plane along the center axis of the bearing shaft 11.

Figure 1:
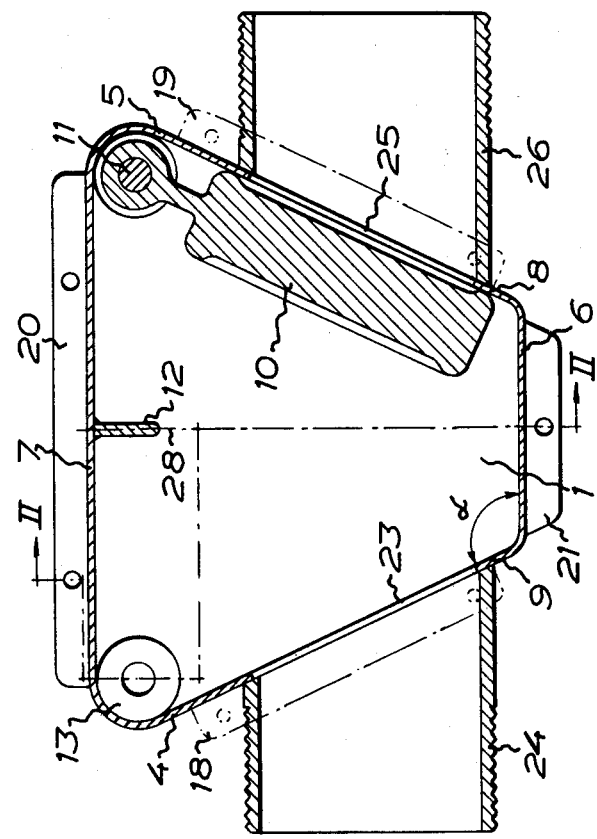
FIG. 1 illustrates a non-return valve in sectional view.

The non-return valve now described is easy to mount in a horizontal or vertical position even close to a ceiling or a wall. Thus, in the mounting operation, there is no need to bother which of the openings 23, 25 should be the inlet opening or the outlet opening, since this can be settled simply by disposing the valve flap 10 on one or the other side after the valve assembly has been mounted. Hence, if the valve shown in FIG. 1 is inserted in a vacuum-operated drainage system, the opening 25 of the flap 10, as it is now disposed, will serve as inlet and the opening 23 as outlet, i.e. when the socket 24 and the opening 23 are under vacuum, the flap 10 will swing upwards and material coming from the pipe connected to the socket 26 can pass through the valve and flow on through the drain pipe connected to the socket 24. In case the valve does not work satisfactorily, it is easy to unscrew the inspection cover and check the valve flap. If malfunction is due to wear, this deficiency may readily be put right simply by reversing the valve flap 10. On the next occasion, the flap 10 is exchanged for a new one. In case functional disorder occurs "upstream" and large amounts of air enter into the system and repair work has to be carried out under atmospheric pressure, the valve flap can be shifted to the opposite side so as to seal against the seat 9 and thus act as an efficient blocking valve, allowing the rest of the system to operate in a normal way. Hence, the valve can replace a separate shut-off valve. As pointed out above, the valve can be mounted horizontally and vertically but also at all intermediate angles. When the valve is mounted in a vertical position, the socket 26 is directed downwardly and the valve flap 10 is in the position shown in the drawing, i.e. it seals against the seat 8. If, in this case, a blast of air causes the flap to open fully and swing towards the transverse side 7, the abutment 12 will prevent the center of gravity of the valve flap from passing the vertical plane or vertical line through the shaft 11, and the flap will always drop back onto the valve seat under its own weight.

Although the non-return valve of the invention is particularly usable in sanitary vacuum techniques, it may of course also be most useful in other fields using vacuum or pressure.

What I claim and desire to secure by Letters Patent is:

1. A reversible flap-type non-return valve comprising
   a valve housing with two through-flow openings substantially facing each other, said valve housing minimizing its interior volume and having in a first plane the basic cross-sectional form of a trapezoid, the parallel sides of said trapezoid being lower and upper transverse sides of said housing and the non-parallel sides of said trapezoid being transverse sides of the housing including said openings;
   a removable inspection cover forming one side of said housing being substantially plane and disposed substantially parallel to said first plane;
   bearing means attached to the valve housing defining two turning axes perpendicular to said first plane and including two pairs of bearing bushings, each pair having a fixed position one for each of said turning axes and one bearing bushing of each pair being at least in part in said removable inspection cover; and
   a movable valve flap disposed at one of the turning axes of the bearing means and suitable as a closing member at both of the two through-flow openings.

2. Valve as claimed in claim 1, in which each said bearing means comprises one bearing bushing fixed to the inner side of said inspection cover, and one bearing bushing fixed to the flat side opposite said inspection cover, said bearing bushings having registering openings for receiving the opposite ends of a bearing shaft for the valve flap.

3. Valve as claimed in claim 2, in which said bearing bushings are mounted adjacent the corners between the upper transverse side of said housing and each of said transverse sides including one of said openings.

4. Valve as claimed in claim 3, in which said upper transverse side has an abutment directed towards the center of the valve housing for restricting the pivotal movement of the valve flap.

5. Valve as claimed in claims 1, 2, 3 or 4, in which said valve flap has sealing surfaces on opposed sides said sealing surfaces being symmetric with respect to a plane through one of said turning axes.

* * * * *